United States Patent
Lee et al.

(10) Patent No.: US 10,161,291 B2
(45) Date of Patent: Dec. 25, 2018

(54) ENGINE SYSTEM HAVING COOLANT CONTROL VALVE

(71) Applicant: Hyundai Motor Company, Seoul (KR)

(72) Inventors: Hyo Jo Lee, Suwon-si (KR); Sang Phil Han, Suwon-si (KR)

(73) Assignee: Hyundai Motor Company, Seoul (KR)

(*) Notice: Subject to any disclaimer, the term of this patent is extended or adjusted under 35 U.S.C. 154(b) by 45 days.

(21) Appl. No.: 15/377,631

(22) Filed: Dec. 13, 2016

(65) Prior Publication Data

US 2018/0051620 A1 Feb. 22, 2018

(30) Foreign Application Priority Data

Aug. 16, 2016 (KR) .................. 10-2016-0103735

(51) Int. Cl.
| | |
|---|---|
| *F01P 7/16* | (2006.01) |
| *F01P 7/14* | (2006.01) |
| *F02M 26/32* | (2016.01) |
| *F01P 3/02* | (2006.01) |
| *F01P 3/20* | (2006.01) |
| *F01P 11/02* | (2006.01) |
| *F01P 11/16* | (2006.01) |
| *F01P 3/00* | (2006.01) |

(52) U.S. Cl.
CPC .................. *F01P 7/14* (2013.01); *F01P 3/02* (2013.01); *F01P 3/20* (2013.01); *F01P 11/028* (2013.01); *F01P 11/16* (2013.01); *F02M 26/32* (2016.02); *F01P 2003/006* (2013.01); *F01P 2007/146* (2013.01); *F01P 2060/00* (2013.01); *F01P 2060/04* (2013.01); *F01P 2060/18* (2013.01)

(58) Field of Classification Search
CPC .... F01P 11/028; F01P 11/16; F01P 2003/006; F01P 2007/146; F01P 2060/00; F01P 2060/04; F01P 2060/18; F01P 3/02; F01P 3/20; F01P 7/14; F02M 26/32
USPC ....... 123/41.01, 41.09, 41.2, 41.08; 137/607, 137/867, 554, 551, 630.2, 636.1
See application file for complete search history.

(56) References Cited

U.S. PATENT DOCUMENTS

| | | | | |
|---|---|---|---|---|
| 3,246,637 | A | * | 4/1966 | Walsh .................... F01P 11/028 |
| | | | | 123/41.1 |
| 3,759,233 | A | * | 9/1973 | Schlaffer .................. F01P 7/16 |
| | | | | 123/41.08 |
| 4,383,501 | A | * | 5/1983 | Yokoyama ................ F01P 7/16 |
| | | | | 123/41.1 |

(Continued)

FOREIGN PATENT DOCUMENTS

| | | | | |
|---|---|---|---|---|
| DE | 10047081 | A1 * | 5/2002 | ................ F01P 7/16 |
| DE | 102012213262 | A1 * | 5/2014 | .............. F01P 11/16 |

(Continued)

*Primary Examiner* — Grant Moubry
*Assistant Examiner* — Tea Holbrook
(74) *Attorney, Agent, or Firm* — Morgan, Lewis & Bockius LLP

(57) ABSTRACT

An engine system having a coolant control valve device may include valves that distribute coolant that is injected into a coolant inflow chamber to coolant demand elements, respectively; a driver that operates each of the valves; a safety valve that bypasses coolant that is operated by a coolant temperature to be injected into the coolant inflow chamber; and a degassing member that collects coolant including a bubble, wherein a degassing passage that is opened or closed by operation of the safety valve is formed.

13 Claims, 6 Drawing Sheets

(56) References Cited

U.S. PATENT DOCUMENTS

| | | | |
|---|---|---|---|
| 6,045,051 A * | 4/2000 | Ieda | F01P 7/16 236/34 |
| 8,701,603 B2 * | 4/2014 | Warnery | F01P 7/167 123/41.08 |
| 9,581,072 B2 * | 2/2017 | Hutchins | |
| 2006/0005789 A1 * | 1/2006 | Miura | F01P 7/16 123/41.1 |
| 2009/0277401 A1 * | 11/2009 | Theorell | F01P 11/028 123/41.1 |
| 2010/0031901 A1 * | 2/2010 | Dahl | F01P 11/028 123/41.05 |
| 2011/0023797 A1 * | 2/2011 | Lenz | F01P 3/02 123/41.29 |
| 2011/0023799 A1 * | 2/2011 | Lenz | F01P 3/02 123/41.79 |
| 2011/0303295 A1 * | 12/2011 | Hohenboeken | F01P 11/0276 137/1 |
| 2012/0279462 A1 * | 11/2012 | Warnery | F01P 7/167 123/41.08 |
| 2013/0333640 A1 | 12/2013 | Kardos et al. | |
| 2014/0374495 A1 * | 12/2014 | Malone | F01P 7/14 236/34.5 |
| 2015/0176472 A1 * | 6/2015 | Hutchins | F01P 7/16 701/102 |
| 2016/0084143 A1 * | 3/2016 | Lee | F01P 7/165 123/41.08 |
| 2016/0090895 A1 * | 3/2016 | Sakurai | F01P 1/06 123/41.1 |
| 2016/0146092 A1 * | 5/2016 | Lee | F01P 7/16 123/41.1 |
| 2016/0160737 A1 * | 6/2016 | Lee | F01P 7/14 123/41.08 |
| 2017/0089251 A1 * | 3/2017 | Shimatani | F01P 7/14 |
| 2017/0184008 A1 * | 6/2017 | Nagai | F01P 3/02 |
| 2017/0211462 A1 * | 7/2017 | Chen | F02B 29/0443 |
| 2017/0284276 A1 * | 10/2017 | Wilder | F01P 7/14 |
| 2017/0370272 A1 * | 12/2017 | Koguchi | F01P 3/02 |

FOREIGN PATENT DOCUMENTS

| | | |
|---|---|---|
| JP | 06101477 A * | 4/1994 |
| JP | 2013-517416 A | 5/2013 |
| JP | 2013-238138 A | 11/2013 |
| JP | 2016-097923 A | 5/2016 |
| KR | 10-2005-0054054 A | 6/2005 |
| KR | 10-1409483 B1 | 6/2014 |

* cited by examiner

ENGINE SYSTEM HAVING COOLANT CONTROL VALVE

CROSS-REFERENCE TO RELATED APPLICATION

The present application claims priority to Korean Patent Application No. 10-2016-0103735 filed on Aug. 16, 2016, the entire contents of which is incorporated herein for all purposes by this reference.

BACKGROUND OF THE INVENTION

Field of the Invention

The present invention relates to an engine system having a coolant control valve unit that can control each of coolant that is distributed to a radiator, a heater, and an oil cooler to improve entire cooling efficiency and that can effectively remove a bubble that is included in coolant and that can improve high temperature stability of a coolant control.

Description of Related Art

An engine generates a torque by combustion of fuel and discharges the remaining energy as heat energy. Particularly, while circulating the engine, a heater, and a radiator, coolant absorbs heat energy and discharges the heat energy to the outside.

When a coolant temperature of the engine is low, viscosity of oil increases and thus a frictional force thereof increases and fuel consumption may increase and a temperature of an exhaust gas slowly rises, whereby an activation time of a catalyst may be extended and a quality of an exhaust gas may be deteriorated. Further, as a normalization time of a heater function is extended, an occupant and a driver may be cold.

When a coolant temperature of the engine is excessively high, knocking occurs, and in order to suppress knocking, when adjusting ignition timing, a performance thereof may be deteriorated. Further, when a lubricant temperature is excessively high, a lubrication operation may be deteriorated.

Therefore, one coolant control valve that controls several cooling elements through one valve is applied with a method of highly maintaining a coolant temperature of a specific portion of an engine and low maintaining a coolant temperature of other portions thereof.

A system that circulates coolant with a high pressure instead of opening coolant to the outside is applied, and as a cooling system becomes complex, a structure and method for effectively removing a bubble that is formed therein are required.

Further, in a condition in which coolant of the engine is in a high temperature, if a coolant control valve does not operate by valve fixation, by enabling a safety valve to operate by a coolant temperature, a research that bypasses coolant to the radiator side has been performed.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an engine system having a coolant control valve device having advantages of being capable of controlling each of coolant that is distributed to an oil cooler, a heater core, an exhaust-gas recirculation (EGR) cooler, and a radiator, increasing a coolant amount that is supplied to the radiator side in a high temperature condition of coolant, and effectively collecting a bubble of coolant in a middle temperature/high temperature condition of coolant.

Various aspects of the present invention are directed to providing an engine system having a coolant control valve device including: valves that distribute coolant that is injected into a coolant inflow chamber to coolant demand elements, respectively; a driver that operates each of the valves; a safety valve that bypasses coolant that is operated by a coolant temperature to be injected into the coolant inflow chamber; and a degassing box that collects coolant including a bubble, wherein a degassing passage that is opened or closed by operation of the safety valve is formed.

The safety valve may open or close an emergency passage, and the degassing passage may be connected with the emergency passage.

The safety valve may include: a body having a wax chamber therein and having an external circumference that opens and closes the emergency passage and the degassing passage; a piston that penetrates one side of the body to be inserted into the wax chamber; a wax that is filled in the wax chamber and that is expanded or contracted by coolant that is injected into the coolant inflow chamber to push the piston to the outside or to pull the piston to the inside; and an elastic member that elastically supports the body such that the body closes the emergency passage.

Coolant, having passed through a cylinder head and a cylinder block of the engine may be supplied to the coolant inflow chamber.

The coolant demand elements may include a heater core, an EGR cooler, an oil cooler, or a radiator, wherein the valves may include: a first valve that opens and closes a first passage that supplies coolant to the heater core and the EGR cooler; a second valve that opens and closes a second passage that supplies coolant to the oil cooler; or a third valve that opens and closes a third passage that supplies coolant to the radiator.

The driver may include: a cam having a cam profile that comes in close contact with front end portions of the first, second, and third valves; an elastic member that elastically supports rear end portions of the first, second, and third valves such that the front end portions of the first, second, and third valves come in close contact with the cam profile; and a torque source that rotates the cam to enable the cam profile to push the front end portions of the first, second, and third valves to thus enable the first, second, and third valves to open or close the first, second, and third passages, respectively.

The safety valve may be operated by a coolant temperature of the coolant inflow chamber to bypass coolant of the coolant inflow chamber to the radiator side.

The engine system may further include: a pressure cap that maintains an internal pressure of the degassing box to a predetermined numerical value or more and that discharges a bubble to the outside; and a coolant pump that recirculates coolant that is circulated from the degassing box and the coolant demand elements to the coolant control valve device.

The torque source may be a motor, and the engine system may further include a control device that controls rotation of the motor according to a driving condition.

The engine system may further include a valve housing that has the first, second, and third passages and the first, second, and third valves that open or close the first, second, and third passages therein and in which the coolant inflow chamber is formed.

Various aspects of the present invention are directed to providing an engine system having a coolant control valve device including: valves that are disposed at a valve housing to distribute coolant that is injected into a coolant inflow chamber to coolant demand elements, respectively; a driver that lifts each of the valves to enable the valves to open or close passages; a safety valve that is disposed at an emergency passage to bypass coolant that is operated by a coolant temperature to be injected into the coolant inflow chamber to the radiator side; and a degassing box that collects coolant including a bubble, wherein a degassing passage is formed that transfers a bubble that is included in coolant that is connected with the degassing box at an internal side surface of the emergency passage to pass through the emergency passage to the degassing box.

The safety valve may include: a body having a wax chamber therein and having an external circumference that opens and closes the emergency passage and the degassing passage; a piston that penetrates one side of the body to be inserted into the wax chamber; a wax that is filled in the wax chamber and that is expanded or contracted by coolant that is injected into the coolant inflow chamber to push the piston to the outside or to pull the piston to the inside; and an elastic member that elastically supports the body such that the body closes the emergency passage.

The driver may include: a cam having a cam profile that comes in close contact with front end portions of each of the valves; an elastic member that elastically supports each of rear end portions of the valves such that the front end portions of each of the valves come in close contact with the cam profile; and a torque source that rotates the cam to enable the cam profile to push the front end portions of the valves to thus enable the valves to open or close the passages, respectively.

The coolant demand elements may include a heater core, an exhaust-gas recirculation (EGR) cooler, an oil cooler, or a radiator, wherein the valves may include: a first valve that opens and closes a first passage that supplies coolant to the heater core and the EGR cooler; a second valve that opens and closes a second passage that supplies coolant to the oil cooler; or a third valve that opens and closes a third passage that supplies coolant to the radiator.

According to an exemplary embodiment of the present invention for achieving such an object, an engine system having a coolant control valve device controls each of coolant that is distributed to an oil cooler, a heater core, an EGR cooler, and a radiator, and a safety valve is operated in a high temperature condition of coolant to increase a coolant amount that is supplied to the radiator side and can effectively collect a bubble of coolant in a middle temperature/high temperature condition by opening or closing a degassing passage.

Further, in a state in which a coolant control valve device is fixed, a safety valve opens an emergency passage to enable coolant to flow to the radiator side and can easily collect a bubble that is included in coolant through an open operation to a degassing box.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
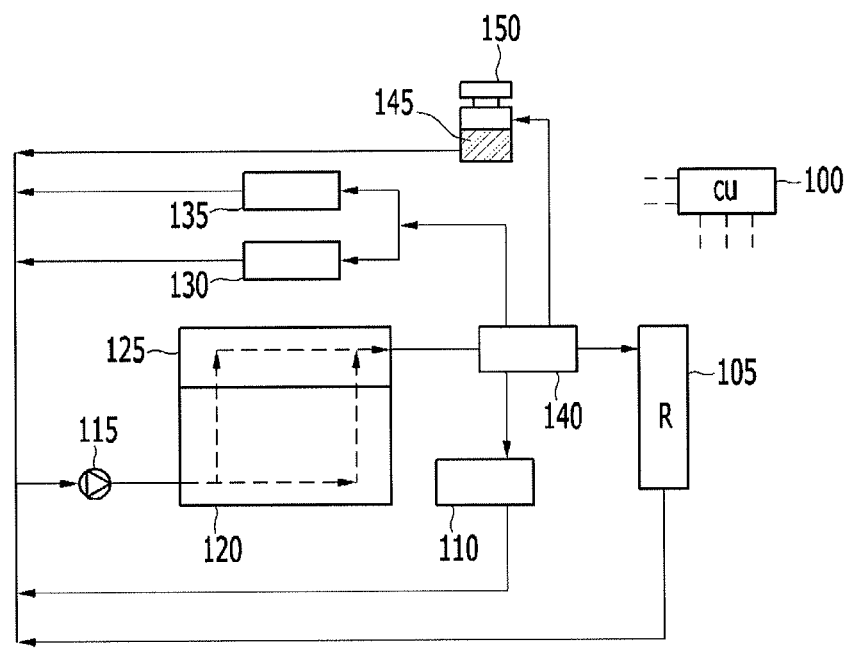
FIG. 1 is a schematic diagram illustrating entire flow of coolant in an engine system having a coolant control valve device according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An example embodiment of the present invention will hereinafter be described in detail with reference to the accompanying drawings.

FIG. 1 is a schematic diagram illustrating entire flow of coolant in an engine system having a coolant control valve device according to an exemplary embodiment of the present invention.

Referring to FIG. 1, the engine system includes a cylinder block 120, a cylinder head 125, a coolant pump 115, a coolant control valve device 140, a radiator 105, a degassing box 145, a heater core 135, an exhaust-gas recirculation (EGR) cooler 130, an oil cooler 110, and a control device 100.

In the engine, the cylinder head 125 is disposed on the cylinder block 120, and the coolant pump 115 pumps coolant to one side of the cylinder block 120.

A portion of coolant that is supplied to the cylinder block 120 is supplied to the cylinder head 125 side, and coolant, having passed through the cylinder block 120 and the cylinder head 125 is supplied to the coolant control valve device 140.

The coolant control valve device 140 may control coolant that is supplied to the heater core 135 and the EGR cooler 130, control coolant that is supplied to the radiator 105, and control coolant that is supplied to the oil cooler 110.

At an upper portion of the system, the degassing box 145 that collects coolant including a bubble is disposed, and a degassing line is formed from the coolant control valve device 140 toward the degassing box 145.

In the degassing box 145, an outlet that is opened to the outside is formed, and at the outlet, a pressure cap 150 is disposed, and the pressure cap 150 maintains an internal pressure of the degassing box 145 to a predetermined value or more.

A portion of a bubble that is collected in the degassing box 145 is discharged to the outside through the pressure cap 150, and collected coolant is recirculated to the suction side of the coolant pump 115.

The control device 100 actively controls the coolant control valve device 140 according to a driving condition and a coolant temperature, collects a bubble existing within the coolant control valve device 140 with the degassing box 145, and collects a bubble that is included in coolant that passes through the first coolant line with the degassing box 145.

The control device 100 may be implemented with at least one microprocessor operating by a predetermined program, and the predetermined program may include a series of instructions for performing a method according to an exemplary embodiment of the present invention to be described later.

Figure 2:
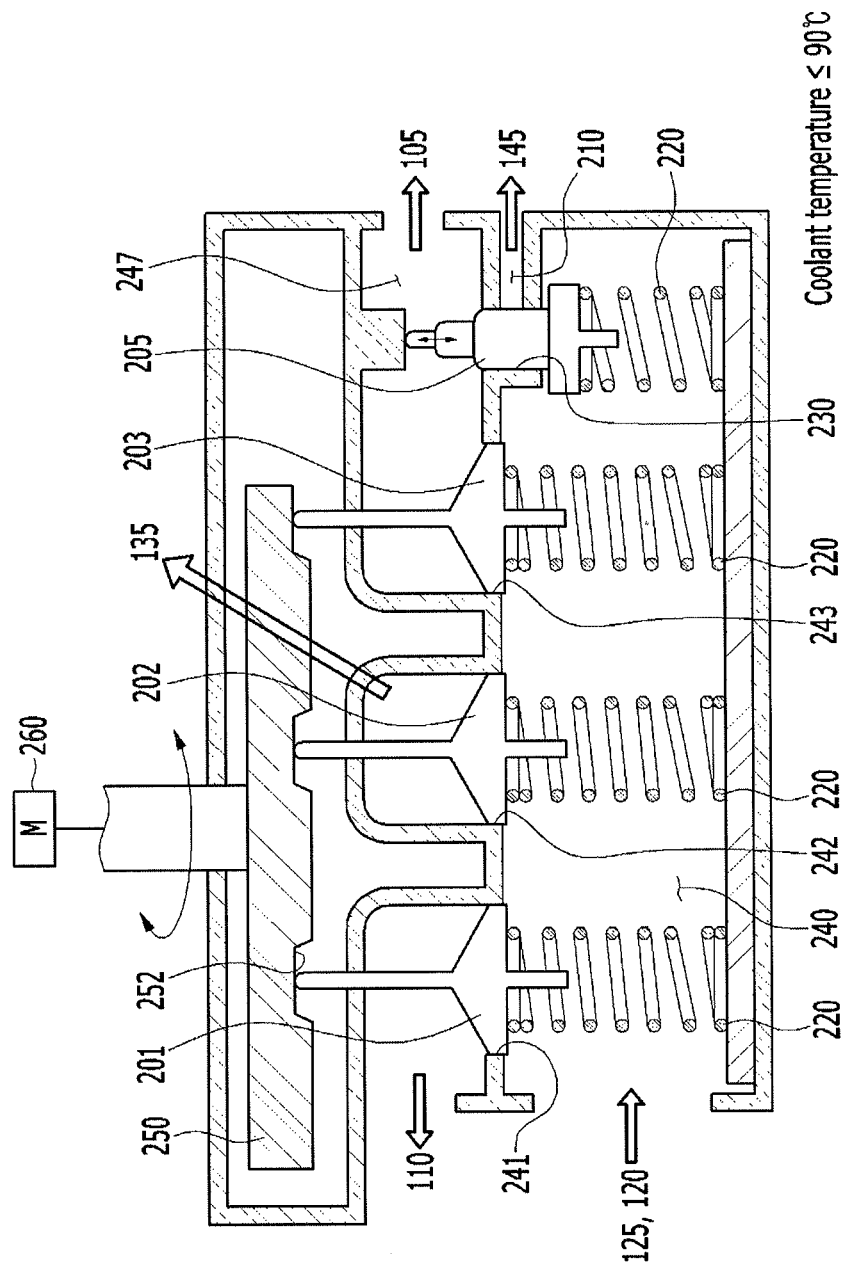
FIG. 2 is a schematic cross-sectional view of a coolant control valve device in a low temperature condition according to an exemplary embodiment of the present invention.

FIG. 2 is a schematic cross-sectional view of a coolant control valve device in a low temperature condition according to an exemplary embodiment of the present invention.

Referring to FIG. 2, constituent elements of the coolant control valve device include a coolant inflow chamber 240, a first passage 241, a second passage 242, a third passage 243, an emergency passage 230, a degassing passage 210, a first valve 201, a second valve 202, a third valve 203, a safety valve 205, an elastic member 220, a cam 250, a torque source 260, an exhaust chamber 247, and a control device 100.

In a lower portion within a valve housing of the coolant control valve device 140, the coolant inflow chamber 240 is formed, and the coolant inflow chamber 240 receives coolant, having passed through the cylinder block 120 and the cylinder head 125.

The first passage 241, the second passage 242, and the third passage 243 are each formed at a predetermined position upward at the coolant inflow chamber 240. The emergency passage 230 is formed at one side of the third passage 243 upward at the coolant inflow chamber 240.

At the first passage 241, the first valve 201 is disposed, at the second passage 242, the second valve 202 is disposed, at the third passage 243, the third valve 203 is disposed, and at the emergency passage 230, the safety valve 205 is disposed.

At one surface of the cam 250, a cam profile 252 is formed to correspond to an upper end portion of the first, second, and third valves 201, 202, and 203, and the cam profile 252 is disposed to press an upper end portion of the first, second, and third valves 201, 202, and 203 downward.

Here, when the torque source 260 including a motor rotates the cam 250, the cam profile 252 presses the corresponding first, second, and third valves 201, 202, and 203 downward and thus the first, second, and third valves 201, 202, and 203 open or close the first, second, and third passages 241, 242, and 243, respectively.

The elastic member 220 elastically supports the first, second, and third valves 201, 202, and 203 upward to enable the first, second, and third valves 201, 202, and 203 to close the first, second, and third passages 241, 242, and 243. The safety valve 205 is operated by a coolant temperature to open or close the emergency passage 230, and the elastic member 220 elastically supports the safety valve 205 upward and thus the safety valve 205 closes the emergency passage 230.

The safety valve 205 bypasses coolant of the coolant inflow chamber 240 to the exhaust chamber 247 to prevent coolant from being overheated.

In an exemplary embodiment of the present invention, the degassing passage 210 is connected with an internal circumference of the emergency passage 230, and the safety valve 205 is inserted into the emergency passage 230 to together open or close the degassing passage 210.

First, a structure of the safety valve 205 will be described with reference to FIG. 6.

Figure 6:
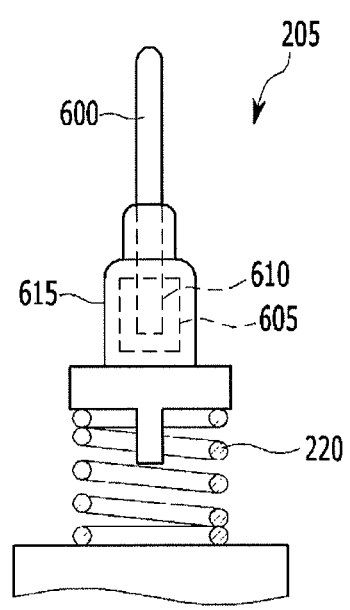
FIG. 6 is a schematic front view of a safety valve according to an exemplary embodiment of the present invention.

FIG. 6 is a schematic front view of a safety valve according to an exemplary embodiment of the present invention.

Referring to FIG. 6, the safety valve 205 includes a piston 600, a body 615, a wax 610, a wax chamber 605, and an elastic member 220.

The body 615 is inserted into the emergency passage 230 to open or close the emergency passage 230 and to open or close the degassing passage 210 that is connected with the emergency passage 230.

The wax chamber 605 is formed within the body 615, and the wax 610 is filled in the wax chamber 605. A lower end portion of the piston 600 is inserted into the wax chamber 605 through an upper end portion of the body 615, and an upper end portion of the piston 600 is disposed at an upper portion. The elastic member 220 elastically supports a lower end portion of the body 615 upward.

When the wax 610 that is filled within the wax chamber 605 expands by a coolant temperature, the piston 600 moves upward, and when the wax 610 contracts by a coolant temperature, the piston 600 moves downward.

Referring again to FIGS. 1 and 6, when the piston 600 moves upward, the body 615 moves downward to open the emergency passage 230 and to open the degassing passage 210. Alternatively, the body 615 may close the emergency passage 230 and open the degassing passage 210.

Figure 3:
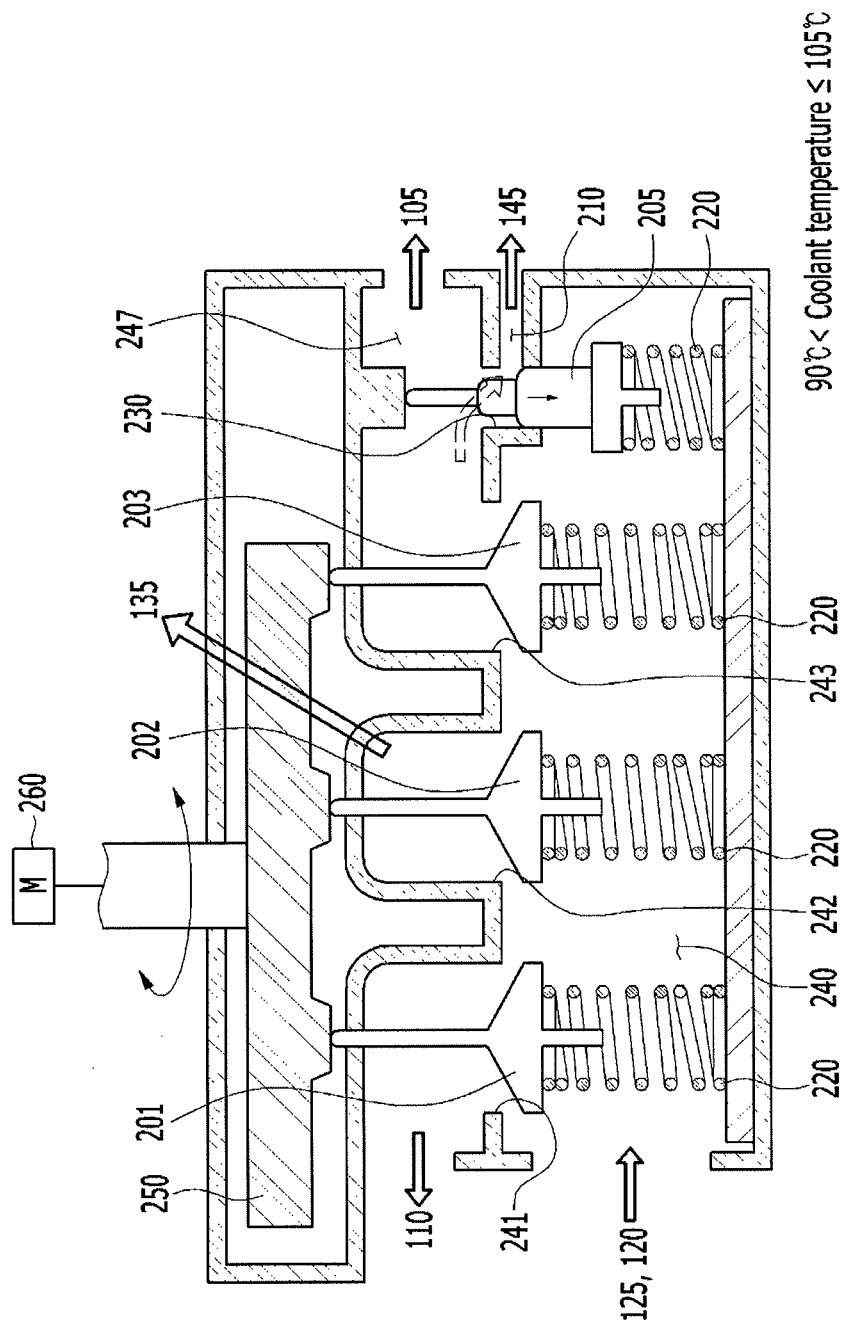
FIG. 3 is a schematic cross-sectional view of a coolant control valve device in a middle temperature condition according to an exemplary embodiment of the present invention.

FIG. 3 is a schematic cross-sectional view of a coolant control valve device in a middle temperature condition according to an exemplary embodiment of the present invention.

Referring to FIG. 3, when a coolant temperature is in a range of 90° C. to 105° C., the cam 250 rotates by the torque source 260 and thus when the first valve 201 moves downward, coolant of the coolant inflow chamber 240 is supplied to the oil cooler 110, and when the second valve 202 moves downward, coolant is supplied to the heater core 135 and the EGR cooler 130, and when the third valve 203 moves downward, coolant is supplied to the radiator 105. Only one or two of the first, second, and third passages 241, 242, and 243 may be opened according to a design specification.

That is, the first valve 201, the second valve 202, and the third valve 203 are opened, and the safety valve 205 starts to slowly open.

Therefore, a portion of coolant that is supplied from the coolant inflow chamber 240 to the exhaust chamber 247 through the third passage 243 to be circulated to the radiator 105 and that is supplied to the exhaust chamber 247 is circulated to the degassing box 145 through the degassing passage 210.

In an exemplary embodiment of the present invention, coolant including a bubble through the degassing passage 210 is circulated to the degassing box 145, and a bubble that is included in coolant is discharged to the outside.

Figure 4:
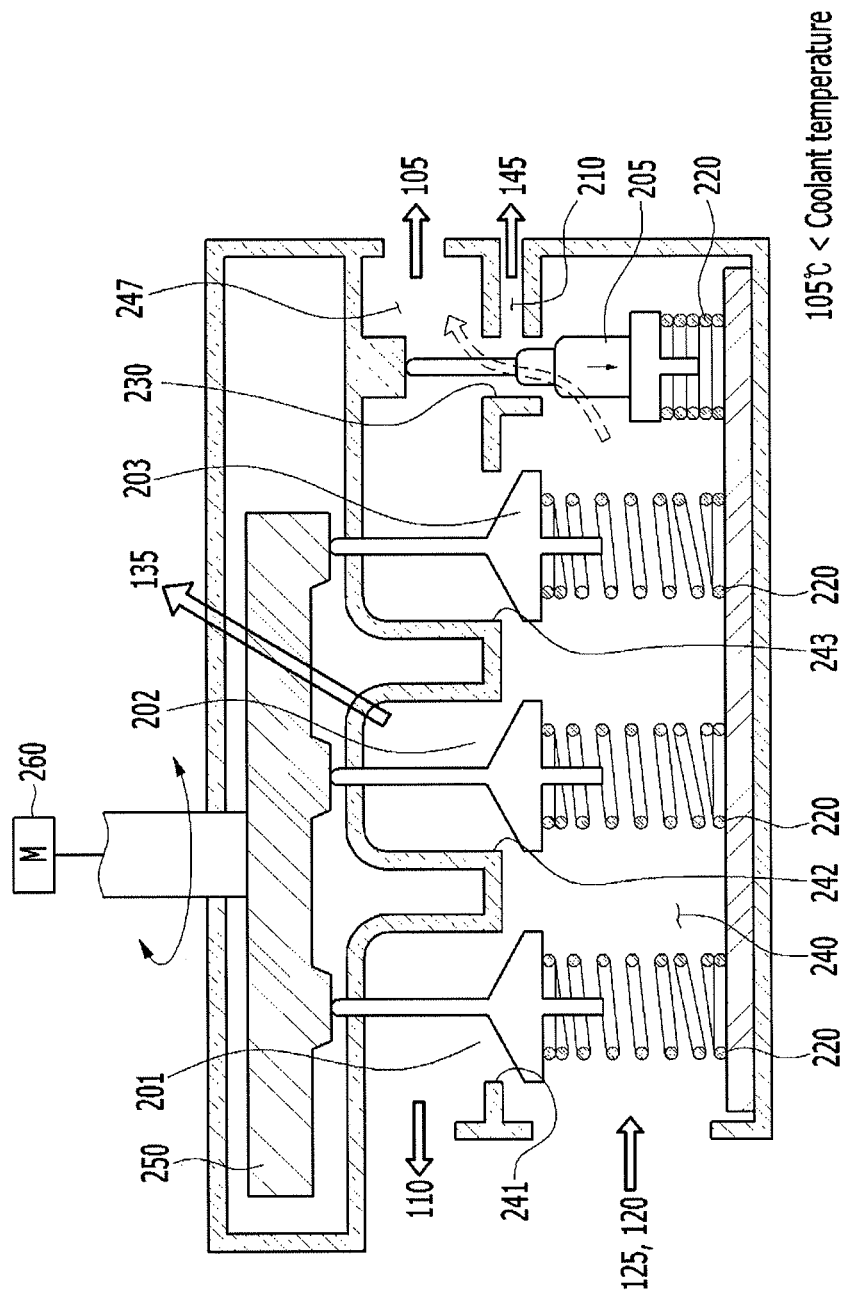
FIG. 4 is a schematic cross-sectional view of a coolant control valve device in a high temperature condition according to an exemplary embodiment of the present invention.

FIG. 4 is a schematic cross-sectional view of a coolant control valve device in a high temperature condition according to an exemplary embodiment of the present invention.

Referring to FIG. 4, when a coolant temperature is higher than 105° C., the cam 250 rotates by the torque source 260 and thus when the first valve 201 moves downward, coolant of the coolant inflow chamber 240 is supplied to the oil cooler 110, and when the second valve 202 moves downward, coolant is supplied to the heater core 135 and the EGR cooler 130, and when the third valve 203 moves downward, coolant is supplied to the radiator 105.

That is, the first valve 201, the second valve 202, and the third valve 203 are opened, and the safety valve 205 is completely opened.

Therefore, coolant is supplied from the coolant inflow chamber 240 to the radiator 105 side through the exhaust chamber 247 and through the third passage 243 and the emergency passage 230 and thus a flow rate of coolant increases.

Further, a portion of coolant moving through the third passage 243 and the emergency passage 230 is circulated to the degassing box 145 through the degassing passage 210.

Figure 5:
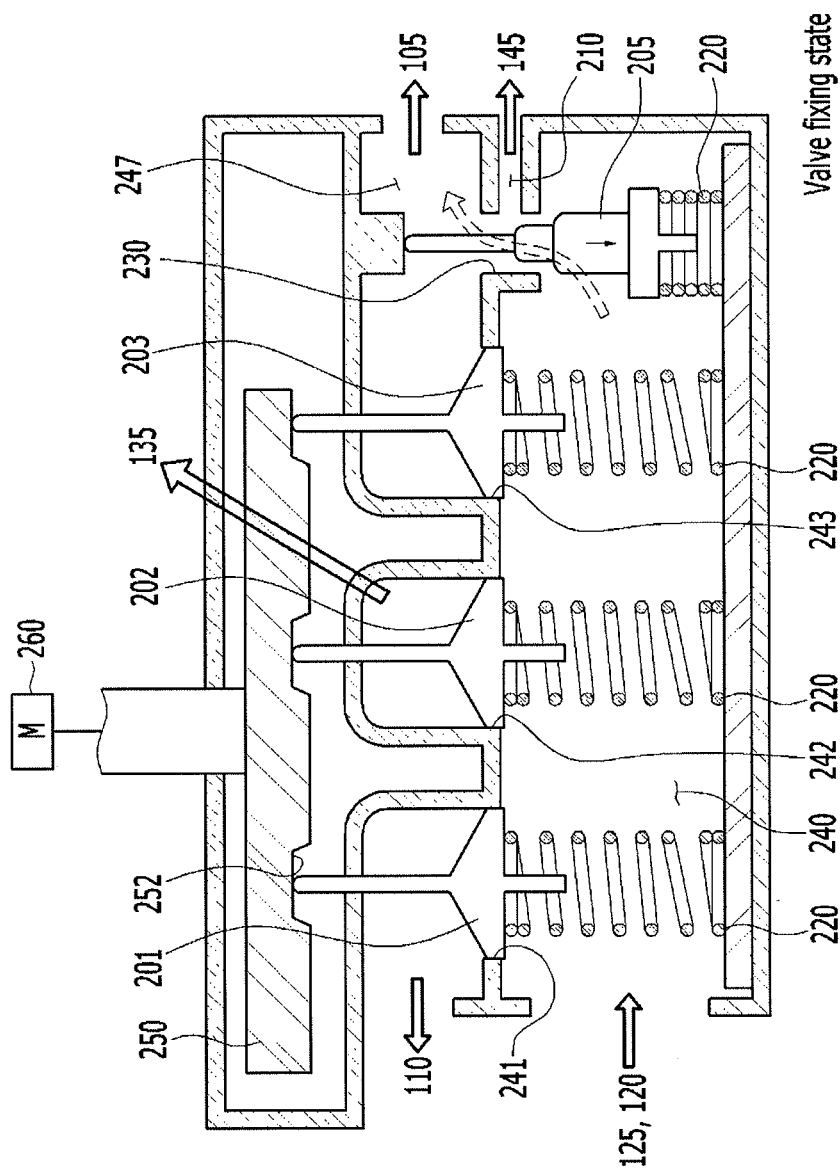
FIG. 5 is a schematic cross-sectional view illustrating a state in which a coolant control valve device is fixed in a high temperature condition according to an exemplary embodiment of the present invention.

FIG. 5 is a schematic cross-sectional view illustrating a state in which a coolant control valve device is fixed in a high temperature condition according to an exemplary embodiment of the present invention.

Referring to FIG. 5, in a state in which a coolant temperature is higher than 105° C., when a movement of the cam 250 is failed, the first, second, and third valves 201, 202, and 203 may close the first, second, and third passages 241, 242, and 243.

However, the safety valve 205 is operated by a coolant temperature to be completely opened.

Therefore, coolant is supplied from the coolant inflow chamber 240 to the exhaust chamber 247 through the emergency passage 230 to be circulated to the radiator 105 side.

Further, a portion of coolant moving through the emergency passage 230 is circulated to the degassing box 145 through the degassing passage 210.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings.

The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An engine cooling system comprising:
a coolant control valve device including:
 a valve housing including a coolant inflow chamber therein;
 a plurality of valves that distribute coolant flowing into the coolant inflow chamber to coolant demand elements, respectively;
 a driver that is engaged with the plurality of valves and operates each of the plurality of valves;
 a safety valve disposed in the valve housing and bypassing the coolant toward a degassing passage connected to the coolant inflow chamber, by selectively opening or closing the degassing passage, the safety valve being operated by a coolant temperature of the coolant flowing into the coolant inflow chamber, wherein the degassing passage is formed at a passage formed in the coolant inflow chamber and configured for forwarding the coolant to a radiator so that a part of the coolant forwarded to the radiator is bypassed to the degassing passage; and
 a degassing storage that is connected to the degassing passage and collects coolant including a bubble supplied from the coolant control valve device through the degassing passage,
where the valve housing stores the plurality of valves, the driver, and the safety valve.

2. The engine cooling system of claim 1, wherein the safety valve opens or closes an emergency passage, and the degassing passage is connected with the emergency passage.

3. The engine cooling system of claim 2, wherein the safety valve includes:
 a body having a wax chamber therein and having an external circumference that opens or closes the emergency passage and the degassing passage;
 a piston that penetrates a first side of the body to be inserted into the wax chamber;
 a wax that is filled in the wax chamber and that is expanded or contracted by coolant that is injected into the coolant inflow chamber to push the piston to an outside of the wax chamber or to pull the piston to an inside of the wax chamber; and
 an elastic member that elastically supports the body, wherein the body selectively closes the emergency passage according to a movement of the piston.

4. The engine cooling system of claim 1, wherein coolant, having passed through a cylinder head and a cylinder block of an engine is supplied to the coolant inflow chamber.

5. The engine cooling system of claim 4, wherein the coolant demand elements comprise a heater core, an exhaust-gas recirculation (EGR) cooler, an oil cooler, or the radiator,
wherein the plurality of valves comprise:
 a first valve that opens or closes a first passage formed in the coolant inflow chamber, wherein the first passage supplies coolant to the heater core and the EGR cooler;
 a second valve that opens or closes a second passage formed in the coolant inflow chamber, wherein the second passage supplies coolant to the oil cooler; or a third valve that opens or closes a third passage formed in the coolant inflow chamber, wherein the third passage supplies coolant to the radiator.

6. The engine cooling system of claim 5, wherein the driver includes:
   a cam having a cam profile that contacts with front end portions of the first, second, and third valves;
   an elastic member that elastically supports rear end portions of the first, second, and third valves, wherein the front end portions of the first, second, and third valves contact with the cam profile; and
   a torque source that rotates the cam to enable the cam profile to push the front end portions of the first, second, and third valves to thus enable the first, second, and third valves to open or close the first, second, and third passages, respectively.

7. The engine cooling system of claim 5, wherein the safety valve is configured to be operated by the coolant temperature of the coolant inflow chamber to bypass coolant of the coolant inflow chamber to a radiator side.

8. The engine cooling system of claim 7, wherein the torque source is a motor, and
   the engine cooling system further includes a control device that is configured to control rotation of the motor according to a driving condition.

9. The engine cooling system of claim 5, further including:
   a pressure cap that is engaged to the degassing storage and maintains an internal pressure of the degassing storage to a predetermined value or more and that discharges the bubble to an outside of the degassing storage; and
   a coolant pump that recirculates coolant that is circulated from the degassing storage and the coolant demand elements to the coolant control valve device.

10. An engine cooling system comprising:
    a coolant control valve device including:
        a valve housing including a coolant inflow chamber therein;
        a plurality of valves that are disposed at the valve housing to distribute coolant flowing into the coolant inflow chamber to coolant demand elements, respectively;
        a driver that is engaged with the plurality of valves and lifts each of the plurality of valves to enable each valve to open or close passages formed in the coolant inflow chamber;
        a safety valve that is disposed in the valve housing and disposed at an emergency passage that forwards the coolant flowing into the coolant inflow chamber toward a radiator, the safety valve being operated by a coolant temperature of the coolant flowing into the coolant inflow chamber; and
        a degassing storage that collects coolant including a bubble supplied from the safety valve through a degassing passage connected to the coolant inflow chamber,
    wherein the degassing passage is formed at an internal side surface of the emergency passage and is connected with the degassing storage, such that a bubble included in the coolant is forwarded to the degassing storage when the coolant flows to the radiator through the emergency passage by an operation of the safety valve.

11. The engine cooling system of claim 10, wherein the safety valve includes:
    a body having a wax chamber therein and having an external circumference that opens or closes the emergency passage and the degassing passage;
    a piston that penetrates a first side of the body to be inserted into the wax chamber;
    a wax that is filled in the wax chamber and that is expanded or contracted by the coolant that is injected into the coolant inflow chamber to push the piston to an outside of the wax chamber or to pull the piston to an inside of the wax chamber; and
    an elastic member that elastically supports the body, wherein the body selectively closes the emergency passage according to a movement of the piston.

12. The engine cooling system of claim 10, wherein the driver includes:
    a cam having a cam profile that contacts with front end portions of each of the plurality of valves;
    an elastic member that elastically supports each of rear end portions of the plurality of valves, wherein the front end portions of each of the plurality of valves contact with the cam profile; and
    a torque source that rotates the cam to enable the cam profile to push the front end portions of the plurality of valves to thus enable the plurality of valves to open or close the passages formed in the coolant inflow chamber, respectively.

13. The engine cooling system of claim 10, wherein the coolant demand elements comprise a heater core, an exhaust-gas recirculation (EGR) cooler, an oil cooler, or the radiator,
    wherein the plurality of valves comprise:
    a first valve that opens or closes a first passage among the passages formed in the coolant inflow chamber, wherein the first passage supplies coolant to the heater core and the EGR cooler;
    a second valve that opens or closes a second passage among the passages formed in the coolant inflow chamber, wherein the second passage supplies coolant to the oil cooler; or
    a third valve that opens or closes a third passage among the passages formed in the coolant inflow chamber, wherein the third passage supplies coolant to the radiator.

* * * * *